No. 759,431. PATENTED MAY 10, 1904.
R. FORTUN & E. SEMPRUN.
ELECTRIC ACCUMULATOR.
APPLICATION FILED SEPT. 30, 1901.
NO MODEL.
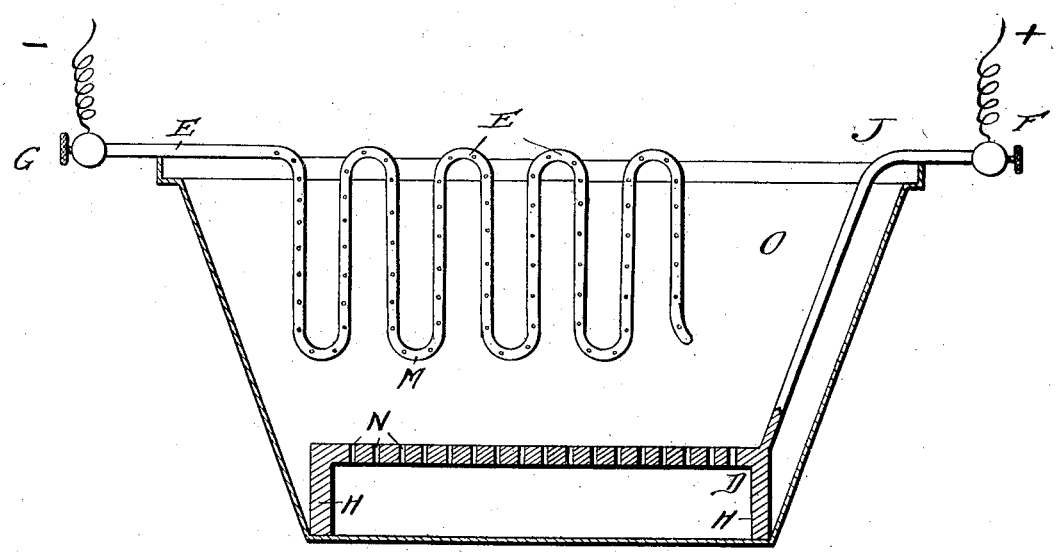

No. 759,431. Patented May 10, 1904.

UNITED STATES PATENT OFFICE.

RICARDO FORTUN AND EDUARDO SEMPRUN, OF MADRID, SPAIN.

ELECTRIC ACCUMULATOR.

SPECIFICATION forming part of Letters Patent No. 759,431, dated May 10, 1904.

Application filed September 30, 1901. Serial No. 77,165. (No specimens.)

*To all whom it may concern:*

Be it known that we, RICARDO FORTUN and EDUARDO SEMPRUN, of Madrid, in the Kingdom of Spain, do hereby declare the nature of this invention and in what manner the same is to be performed to be particularly described and ascertained in and by the following statement.

The present invention relates to a process of manufacture of a new industrial product, chemically defined, that may be employed as an active material in the electrode of the positive pole of electrical accumulators or storage batteries, provided, however, that the electrolyzable liquid or electrolyte of these accumulators or storage batteries, which is generally composed of a solution of sulfuric acid in water be replaced by a liquid electrolyte, the composition of which will hereinafter be described in detail.

The object of this new product is to greatly increase the specific capacity of electric accumulators or storage batteries in which it is used as an active material in order to constitute or form a positive-pole electrode.

The object of this new product is to increase in an extraordinary manner the specific capacity of electric accumulators in which it may be employed as the active agent in making a positive-pole electrode. The process employed, in order to obtain the said industrial product, composed of an oxid of lead that is very active from the view point of its molecular and physical capacity to absorb oxygen in a nascent condition and to which is added twenty per cent. of crucible carbon very finely pulverized by the usual mechanical means, so that when thoroughly and homogeneously mixed with the aforesaid oxid of lead they may constitute the active agent which serves as a base for the positive-pole electrode in electric accumulators, is as follows, reference being had to the accompanying figure, which is a sectional elevation.

In a large porcelain vessel C we place a disk-shaped lead sheet D, having a diameter somewhat smaller than that of the bottom of the vessel upon which it rests on a circular flange or shoulder H, which holds said disk four centimeters above the bottom of said vessel. The lead sheet and flange are made in one piece, and therefrom extends a cylindrical extension J, also of lead, which connects at F with the positive pole of some electrical source. This lead disk also contains numerous openings N N, through which the liquid which fills the vessel C freely circulates. Over the edge of the vessel C and completely insulated from the aforesaid sheet by suitably-arranged porcelain supports is a thick perforated lead tube E E, which extends in an undulatory manner throughout the vessel C and is immersed in the liquid which fills said vessel and the lower undulations M M of which are at a distance of nearly ten centimeters from the lower lead disk. This tube is connected at G to the negative pole of the same electrical source.

As we have already stated, the lead sheet and the curved tube are submerged in the liquid O, which fills the vessel and which, respectively, permit the entrance and departure of an electric current, the intensity of which at a pressure of one hundred and ten volts should not exceed 0.6 amperes for each one thousand cubic centimeters of the liquid which fills the vessel. The composition of said liquid is as follows: a solution of oxid of lead (PbO) chemically pure in a potassium hydroxid lixiviation at thirty-two per cent., having a density of 1.311, the oxid dissolved by saturation seven hundred parts, rock-candy two hundred parts, neutral potassium tartrate one hundred parts, total one thousand parts of liquid, composed as described. As the current passes, a brown substance is slowly deposited upon the lower sheet of lead, which substance when properly dried up and subjected to an electrolytic analysis during a sufficient time in order that in acting as a positive-pole electrode within a platinum crucible its weight may not further be increased. It is then proven that one hundred grams of this substance are capable of fixing three hundred and sixty-nine grams of oxygen, and therefore its centesimal composition is not like any of the known formulas of the oxygen compounds of lead, and thus we are compelled to admit, following the theory of anions, that the substance we employ as a positive-pole electrode is an unstable mixture or compound, but in definite proportions of different oxids of lead with atomic condensation of said metal, which creates for it a new dynamization by virtue of which and by the absorption of eighteen grams of oxygen may be reduced to the centesimal formula of the minimum, as follows: Active substance $$=(PbO_2+PbO)+(Pb_3PbO)_4+(PbO)_3+180=7(Pb_3O_4)=7(PbO_2 2PbO)$$

which is the formula of the minium, and inasmuch as this minium only lacks fourteen equivalents of oxygen in order to be converted into dioxid the result is that our active substance which is converted into minium within the accumulator when the latter is in operation acquires thereby an increase of absorbing capacity eighteen times greater than that of the other known products which are employed for the same purpose, and as these eighteen equivalents of oxygen which our active substance absorbs when operating in the accumulator before being converted into minimum correspond in weight to one gram one hundred and twenty-five milligrams of hydrogen in order to form water the result is that liberating a current of a second ampere 0.01041 of hydrogen each one hundred grams of our active substance has a specific increase (superiority) of $\frac{1{,}125}{0.01041}$ equals one hundred and eight second amperes over the industrial products which are employed for a similar purpose. It should be stated, however, that this active substance is not susceptible of being preserved and of reacting, as already stated, except when immersed in an electrolytic liquid, such as a solution of seventeen parts of nitrate of lead in one hundred of water acidulated with pure nitric acid until it registers 20° on aerometer of Baumé, which solution, besides being the only one which does not effect the chemical composition of our active substance, is also the only one capable of reducing it during the discharge to its primitive formula of $(PbO_2PbO)+(Pb_3PbO)_4+(PbO)_3$.

Having thus described our invention, what we claim is—

The herein-described process of producing a new industrial product adapted to be employed as the active material in the electrode of electric accumulators, which consists in subjecting to the action of electrolysis a solution comprising a saturated solution of oxid of lead in a lixiviation of potassium hydroxid, rock candy and neutral potassium tartrate, and separating the material deposited upon the anode from the electrolyte, substantially as described.

In witness whereof we have hereunto set our hands in presence of two witnesses.

RICARDO FORTUN.
EDUARDO SEMPRUN.

Witnesses:
CHARLES HAEMER,
JUAN JULIAN Y GOMEZ.